United States Patent
Chen et al.

(10) Patent No.: US 9,686,570 B2
(45) Date of Patent: Jun. 20, 2017

(54) METHOD FOR SYNCHRONIZED CONTENT PLAYBACK

(75) Inventors: Jian Feng Chen, Beijing (CN); Xiao Jun Ma, Beijing (CN)

(73) Assignee: THOMSON LICENSING, Issy les Moulineaux (FR)

(*) Notice: Subject to any disclaimer, the term of this patent is extended or adjusted under 35 U.S.C. 154(b) by 57 days.

(21) Appl. No.: 13/577,541

(22) PCT Filed: Feb. 12, 2010

(86) PCT No.: PCT/CN2010/000201
§ 371 (c)(1),
(2), (4) Date: Aug. 7, 2012

(87) PCT Pub. No.: WO2011/097762
PCT Pub. Date: Aug. 18, 2011

(65) Prior Publication Data
US 2012/0311043 A1  Dec. 6, 2012

(51) Int. Cl.
*G06F 15/16* (2006.01)
*H04N 21/234* (2011.01)
(Continued)

(52) U.S. Cl.
CPC ... *H04N 21/23406* (2013.01); *H04N 21/4122* (2013.01); *H04N 21/4307* (2013.01);
(Continued)

(58) Field of Classification Search
CPC .............. H04N 5/928; H04N 21/4122; H04N 21/6377; H04N 21/23406; H04N 21/4307; H04N 21/43615
(Continued)

(56) References Cited

U.S. PATENT DOCUMENTS 5,862,229 A * 1/1999 Shimizu ............... A63F 13/02
                                           345/419
6,339,675 B1 * 1/2002 Shimizu ............... H04N 9/8063
                                           386/337
(Continued)

FOREIGN PATENT DOCUMENTS

CN       101119461      2/2008
CN       101290790      10/2008
(Continued)

OTHER PUBLICATIONS

Fernando Boronat, Jaime Lloret and Miguel Garcia—"Multimedia group and inter-stream synchronization techniques: A comparative study", May 13, 2008, ElSevier, Information Systems 34 (2009) 108-131.*

(Continued)

*Primary Examiner* — John MacIlwinen
*Assistant Examiner* — Ishrat Rashid

(57) ABSTRACT

It is provided a method for synchronizing content playback at the presentation level, wherein, a first content is presented on a first device and a second content that is the same as or correlated with the first content is presented on a second device. The method comprises steps of receiving status messages from the first device and the second device, wherein the status messages comprise information about playback positions of the first content and the second content currently being playbacked at the presentation level of the first device and the second device; and in response to differences between playback positions of the first content and the second content comprised in the status messages being above a threshold value, performing adjustment to maintain difference of playback positions of the first content and the second content at the presentation level of the first device and the second device below the threshold value.

3 Claims, 3 Drawing Sheets

(51) Int. Cl.
| | |
|---|---|
| *H04N 21/43* | (2011.01) |
| *H04N 21/436* | (2011.01) |
| *H04N 21/44* | (2011.01) |
| *H04N 21/442* | (2011.01) |
| *H04N 21/6377* | (2011.01) |
| *H04N 21/658* | (2011.01) |
| *H04N 21/41* | (2011.01) |

(52) U.S. Cl.
CPC . *H04N 21/43615* (2013.01); *H04N 21/44004* (2013.01); *H04N 21/44227* (2013.01); *H04N 21/6377* (2013.01); *H04N 21/658* (2013.01)

(58) Field of Classification Search
USPC .......................................................... 709/204
See application file for complete search history.

(56) References Cited

U.S. PATENT DOCUMENTS

| | | | | |
|---|---|---|---|---|
| 7,668,914 | B2* | 2/2010 | Parker | H04N 7/17318 370/256 |
| 8,549,575 | B2* | 10/2013 | Amento | H04N 7/17318 725/116 |
| 2004/0125124 | A1* | 7/2004 | Kim | G06F 17/30799 715/716 |
| 2006/0161835 | A1* | 7/2006 | Panabaker | G11B 27/10 715/203 |
| 2008/0291266 | A1 | 11/2008 | Burckart et al. | |
| 2009/0222520 | A1* | 9/2009 | Sloo | H04N 7/17318 709/205 |
| 2010/0142927 | A1* | 6/2010 | Lim | H04N 21/2368 386/239 |

FOREIGN PATENT DOCUMENTS

| | | |
|---|---|---|
| CN | 101304351 | 11/2008 |
| JP | 2005244605 | 9/2005 |
| JP | 2006237918 | 9/2006 |
| JP | 2008135989 | 6/2008 |
| JP | 2009010581 | 1/2009 |

OTHER PUBLICATIONS

Srinivas Ramanathan and P. Venkat Rangan—Continuous Media Synchronization in Distributed Multimedia Systems, dated 1993.*
Ralf Steinmetz. Human Perception of Jitter and Media Synchronization. IEEE Journal on Selected Areas in Communications, Vol. 14, No. 1, Jan. 1996, pp. 61-71.*
Search Rept: Nov. 18, 2010.
Ramanathan, Srinivas,et al. "Continuous media synchronization in distributed multimedia systems." Network and Operating System Support for Digital Audio and Video. Springer Berlin Heidelberg, 1993.
Ramanathan, Srinivas, Harrick M. Vin, and P. Venkat Rangan. "Towards personalized multimedia dial-up services." Computer Networks and ISDN Systems 26.10 (1994): 1305-1322.
Rangan, P. Venkat, et al. "Techniques for multimedia synchronization in network file systems." computer communications 16.3 (1993): 168-176.
Steinmetz, Ralf. "Human perception of jitter and media synchronization." Selected Areas in Communications, IEEE Journal on 14.1 (1996): 61-72.

* cited by examiner

METHOD FOR SYNCHRONIZED CONTENT PLAYBACK

This application claims the benefit, under 35 U.S.C. §365 of International Application PCT/CN2010/000201, filed Feb. 12, 2010, which was published in accordance with PCT Article 21(2) on Aug. 18, 2011 in English.

TECHNICAL FIELD

The present invention relates to data communication, and more particularly, relates to a method for synchronized content playback.

BACKGROUND

Rich media applications become more and more popular as users enjoy active roles in the applications. With the convergence of TV network and Internet, this trend will move from computer to TV screen. Rich media applications enjoy much credit for its superiority in the aspect of user interaction: viewers are allowed not only to watch multiple types of collaborative media content such as video, audio, picture, animation, text, etc. simultaneously, but also to freely switch or transfer media flow among multiple devices. For example, a user can obtain an advertisement video about a car, wherein the car is being presented in a movie; a user can get into a virtual world of a museum in parallel with a video of that museum. In this vision of future TV programs, a single display device is not able to provide enough display space for several simultaneous media renderings. A common practice is to divide TV screen into multiple rendering spaces or simply switch between multiple media renderings. Traditionally, a rich media application is executed by a rich media player on a single device, for example, a flash player on a TV set-top-box (STB)/Tablet/or other type of terminals. When a user interacts with one media content, the rich media player can interpret the interaction event, and make a response on another media based on a rule defined in the rich media format. If two or more pieces of media content are rendered on a single device, it is easier to synchronize them. Another synchronization method for a single device is to use SMIL (Synchronized Multimedia Integration Language), which is deployed widely in mobile multimedia messages. SMIL allows integrating a set of independent multimedia objects into a synchronized multimedia presentation. Using SMIL, an author can 1) describe the temporal behavior of the presentation; 2) describe the layout of the presentation on a screen; 3) associate hyperlinks with media objects. However, the above two methods do not provide a solution for synchronizing media flows of multiple collaborative media content inside a rich media set over multiple display devices.

Several conventional methods exist for media synchronization over multiple devices.

The first one is global timing synchronization by hardware clock system or network time protocol (NTP). NTP provides Coordinated Universal Time (UTC). NTPv4 can usually maintain time within 10 milliseconds (1/100s) over the public Internet, and can achieve accuracies of 200 microseconds (1/5000s) or better in local area networks under ideal conditions. Although NTP protocol can guarantee accurate physical layer synchronization, it cannot reflect the synchronization requirement of the media playing in application layer. In order to map the media playing time line with the physical time line, the terminal needs to check the system clock frequently, which will add the overhead and complexity of software implementation in the terminal.

The second method is deployed for quality of service (QoS) guarantee, such as bandwidth guarantee or delay guarantee. When a viewer is watching multiple display devices simultaneously, a certain amount of time delay is tolerable; however, the delay should be guaranteed and predictable by using media transmission QoS control protocol, such as RTCP (RTP Control Protocol) in conjunction with the RTP (Real-time Transport protocol). RTP carries the media streams (e.g., audio and video), and RTCP is used to monitor transmission statistics and QoS information. In RTCP protocol, report packets are sent periodically to report transmission and reception statistics for all RTP packets sent during a time interval. This type of protocol can guarantee the synchronization at packet level from one sender to multiple receivers, but it still cannot guarantee the playback synchronization finally presented to the viewer because of the difference of packet processing, buffer control, audio/video decoding and player rendering in multiple display devices. The final subjective impression about synchronization from viewer's point of view totally depends on the media frames displayed on screens of display devices.

Therefore, a method for synchronized content playback at the level of content presentation on display devices is required in order not to give viewer impression of non-synchronization over multiple display devices.

SUMMARY

According to an aspect of present invention, a method is described for providing synchronized content playback to at least two display devices at the presentation level, wherein, at least one content flow is provided to the at least two display devices. The method includes of receiving status report messages from the at least two display devices, wherein the status report message includes information about the position of content flow currently being played back at the presentation level of a display device; and if determining the at least one content flow currently being playbacked on the two or more display devices make viewer feel out of synchronization based on the received status report messages, performing adjustment for the at least one content flow so as to eliminate viewer's subjective feeling of out of synchronization.

According to another aspect of present invention, a controlling method is described for content presentation to two devices, wherein a first content is presented on a first device and a second content which is the same as or correlated with the first content is presented on a second device. The method includes: upon determination of subjective feeling of a viewer that the presentations of the first content and the second content are out of synchronization at the presentation level, performing adjustment for the first content and/or the second content so as to reduce the time difference at the presentation level between the first content and the second content on the first device and the second device, respectively.

According to the aspects of present invention, it solves the synchronization problem at the presentation level, eliminates viewer's subjective feeling of out of synchronization, and consequently provides an acceptable QoE to the viewer.

It is to be understood that more aspects and advantages of the invention will be found in the following detailed description of the present invention.

BRIEF DESCRIPTION OF THE DRAWINGS

The accompanying drawings illustrate embodiments of the invention together with the description which serves to explain the principle of the invention. Therefore, the invention is not limited to the embodiments. In the drawings.

DETAILED DESCRIPTION

Figure 1:
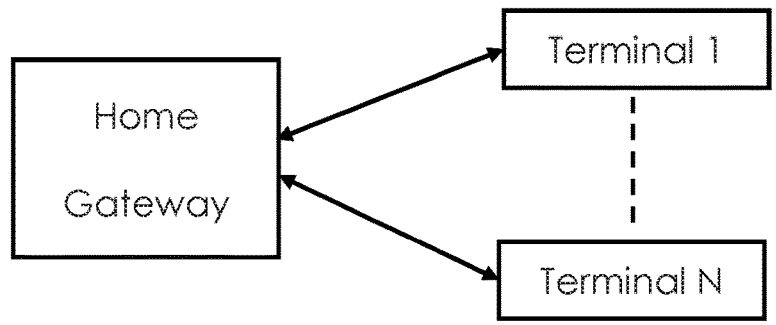
FIG. 1 is a diagram schematically illustrating a system for content distribution according to an embodiment of present invention.

An embodiment of the present invention will now be described in detail in conjunction with the drawings. In the following description, some detailed descriptions of known functions and configurations may be omitted for clarity and conciseness.

According to the principle of the invention, it intends to solve the problem that plays back of multiple media content on two or more display devices make a viewer feel unsynchronized. According to the research and investigation conducted by the inventors, the subjective feeling of viewer about synchronization and out-of-synchronization varies with the delay time between multiple media content rendered on two or more display devices and the visual rhythm of media content. Herein, specific examples of the visual rhythm of the media content include the cases of football match/movie prevue (which are a fast speed rhythm content), news program with announcer in the studio (which is low speed rhythm content), etc. More details about visual rhythm can be found in below description.

Therefore, the present invention maintains the time delay at the presentation level between videos (it can be other types of multimedia) presented on two or more display devices below a maximum tolerable time delay. It should be noted that 1) when the actual time delay exceeds the maximum tolerable time delay for videos of one visual rhythm, the viewer normally feels videos are not synchronized based on his subjective feeling, and therefore the videos are intolerable to watch; 2) the maximum tolerable time delay can be obtained by statistic method, e.g. collecting feedback/questionnaire from a group of viewer; and 3) the maximum tolerable time delay varies with the visual rhythm of video, e.g. the maximum tolerable time delay for a fast change video (e.g. football match) is smaller than that for a slow change video (e.g. news report). Moreover, the maximum tolerable time delay can be further classified based on a combination of visual rhythm and other factors, such as view type, relationship exponent, which will be described below. The actual time delay can be obtained by firstly configuring/requesting the display devices to report their current video frame number/current time position of videos, and then calculating the actual time delay based on the report messages from the display devices. When the actual time delay exceeds the maximum tolerable time delay corresponding to this visual rhythm or combination of visual rhythm and other factors, adjustment is performed to make the actual time delay below the maximum tolerable time delay by adjusting the transmission data rates to display devices and buffer size of the display devices. A person skilled in the art should note that other adjustment means are also possible, such as skipping a certain number of video frames so as to reduce the actual time delay at the presentation/display level. Furthermore, it is noted that all the control functions for synchronized content distribution in the gateway, e.g. processing the report messages, calculating the actual time delay, instructing the gateway to adjust transmission data rate, and instructing the display devices to adjust their buffer size can be migrated from the gateway to an independent control device connecting to the network or any existing device connecting to the network. Therefore, by employing above adaptation mechanism to dynamically adjust the transmission rate in gateway and buffer size and/or rendering speed in display devices, acceptable quality of experience (QoE) in media synchronization is achieved.

A. A Delay Lookup Table Indicating the Relationship Between Mean Option Scores (MOS), Time Delay, and Visual Rhythm is Prepared in Advance. It should be Noted that Other Factors can Also be Added in the Relationship, e.g. View Type and Relationship Exponent Etc., which Will be Described Below:

Defined by ITU-T, QoE represents the overall acceptability of an application service, as perceived subjectively by the end-user. As far as is known, there is no referable QoE evaluation system for media synchronization over two screens for correlative content. Dual screens or two display devices are used to test a number of test viewers when media flows are simultaneously displaying in both screens, so as to obtain the a statistic benchmark value for the subjective remark. MOS is a suitable index by subjectively using a controlled viewing experiment and participants who grade the quality using rating scales. The description of Sync-QoE is the synchronization judgment among a plurality of units of content displayed in multiple screens. This example only uses two screens, one is close to the tester with 10-inch size, and the other is a far-away TV screen with 30-inch size (a person skilled in the art shall note that this statistic method can be applied to the circumstance of more than two screens). Content synchronization is the major issue of psychological score, and other type of visual effect is ignored. Below score definition table shows the evaluation rule for each level's remark.

TABLE 1 score definition table

| Score | Value | Description |
| --- | --- | --- |
| 5 | Excellent | Excellent synchronization |
| 4 | Good | Tiny synchronization, not annoying |
| 3 | Fair | A little out-of-sync., still acceptable |
| 2 | Poor | Obvious out-of- sync., detectable |
| 1 | Bad | Not acceptable |

After testing a group of test viewers and collecting their feedback, a group of benchmark values can be determined. Below shows an example of the statistics result for videos with view type of one view:

TABLE 2 example of statistics result table

| delay(ms) | Fast Speed | Normal Speed | Slow Speed |
| --- | --- | --- | --- |
| 100 | 4.46 | 4.34 | 4.56 |
| 200 | 3.94 | 4.32 | 4.12 |
| 300 | 3.56 | 4.37 | 4.14 |
| 500 | 2.98 | 3.68 | 3.36 |
| 700 | 2.60 | 3.29 | 3.20 |

The table shows the average scores for different delay between two videos with view type of one view presented on two display devices. According to the score definition table, the viewer may feel out of synchronization for fast speed videos if the delay between videos exceeds 500 ms.

The sets for view type and visual rhythm are described below. However, it should be noted that a person skilled in art may design his own view type set and visual rhythm set for his implementation without departing from the principle of present invention.

The view type indicates the camera's location during content creation. In this example, the view type includes one view type, dual view type and multiple view type. The one view type means the content are captured from the same shooting point or a same content is used to display on display devices. The dual view type means two cameras are placed in left and right positions, top and bottom position or other positions of different angles. The multiple view type means multiple cameras are installed for content capture, and there is no fixed angle or lens relationship among them.

The visual rhythm set includes fast speed, normal speed and slow speed in this example, which is used to reflect the subjective feeling of content appearance variation or change in an interval. An example of method for determining the visual rhythm is provided for better understanding the present principles, and should not be used to limit the present invention. Many parameters can be used to indicate the visual rhythm of a video, such as pixel/macro block variation between consecutive video frames. This example uses motion vector (MV) variation among video sequences in YUV format. The YUV model defines a color space in terms of one luma (Y) and two chrominance (UV) components. The YUV model is used in the NTSC, PAL, and SECAM composite color video standards. Since the raw video file is encoded and compressed before network transmission or storage, the package encapsulate format can be MPEG, AVI, RM etc. The frame rate (how many frames will be displayed in a second) and frame size (how many pixels in length and width) will be stored in the file header. In the following calculation, 1 macro block=16 pixel*16 pixel, thus if the video's frame size is 352*288, there will be 396 MB (macro block) in each frame.

```
// iFrameNum is frame account, currMbNum is the MB account
Total_FrameNum = frame rate * video duration;
Total_MbNum = Frame size/pixels in one Macroblock;
MvX=pMetaData->
frame_array[iFrameNum].mb_array[currMbNum].MV[0][0];
MvY=pMetaData->
frame_array[iFrameNum].mb_array[currMbNum].MV[0][1];
//MvX is the Mv value in X axis, considering 2D video
//MvY is the Mv value in Y axis, considering 2D video
mv_maq = sqrt(MvX*MvX + MvY*MvY);
```

$$Sum\_Mv = \sum_{allFrame} \sum_{allMb} mv\_maq;$$

Mv_per_frame = Sum_Mv/Total_FrameNum;
Mv_per_Macroblock = Mv_per_frame/Total_MbNum According to the Mv_per_Macroblock calculated from media content, the visual rhythm of the media content can be determined based on a correspondence table between Mv_per_Macroblock and visual rhythm. Below is a correspondence table for YUV format video with frame size of 352*288.

TABLE 3 correspondence table for visual rhythm

| Mv_per_Macroblock | Visual Rhythm |
|---|---|
| 0~1 | Slow Speed |
| 1~6 | Normal Speed |
| 6+ | Fast Speed |

However, a person skilled in the art should be noted that different correspondence relationship between Mv_per_Macroblock and visual rhythm can be obtained dependent on different implementations, such as using other video formats, etc Below shows an example of delay lookup table (not shown completely) that will be used in the description of the method for content distribution according to the proposed method and apparatus. Herein, another one factor named relationship exponent is added. The relationship exponent set includes tight type and loose type. The tight type means the videos displayed on two or more display devices are tightly integrated with the same object, such as a same video, or a same scene/object is captured by cameras from different angles. The loose type stands for remaining circumstances.

TABLE 4 delay lookup table

| Relationship Exponent | View Type | Visual Rhythm | Delay (ms) | MOS (1 to 5) |
|---|---|---|---|---|
| Tight | One view | Fast | 100 | 4.2 |
| | | | ... | ... |
| | | | 500 | 3.6 |
| | | | ... | ... |
| | | | 1000 | 2.5 |
| Tight | Dual View | Normal | 100 | 4.5 |
| | | | ... | ... |
| | | | 500 | 4 |
| | | | ... | ... |
| | | | 1000 | 2.2 |
| Tight | Multiple view | Slow | 500 | 3 |
| Loose | Dual View | Fast | 1000 | 3 |
| Loose | Multiple view | Normal | 500 | 4 |
| Loose | ... | Slow | 300 | 5 |

B. Method for Synchronized Content Distribution at the Presentation Level is Described Below.

FIG. 1 is a diagram schematically illustrating a system for content distribution according to the proposed method and apparatus. The embodiment is described in a home environment. A person skilled in art should be noted that the proposed method and apparatus shall not be limited to this embodiment. The system in a home environment includes a home gateway and two or more terminals (i.e. display devices) named from terminal 1 to terminal N. The gateway is used to distribute data flows of media content to terminals, and performs adjustment based on status reports sent by the terminals so as to avoid the viewer's feeling of out-of-synchronization as much as possible. The terminal is used to display the received media content, send its status report to the gateway, and execute QoE (quality of experience) command sent by the gateway.

Figure 2:
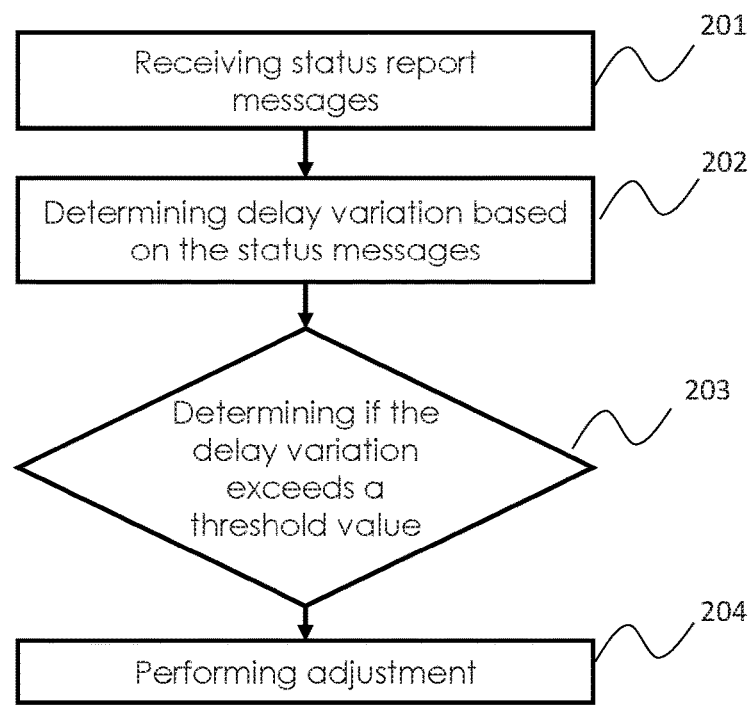
FIG. 2 is a diagram illustrating a method for distribution of media content on the side of gateway according to present embodiment.

FIG. 2 is a diagram illustrating a method for distribution of media content on the side of gateway in a system comprising two terminals according to present embodiment.

At the 201, the gateway receives status report messages from the two terminals. The status report message may include information about free buffer length, content playing status (play, pause, stop etc.), packet reception status etc. A person skilled in the art may add or remove one or more piece of information included in the status report message based on his implementation of the proposed method and apparatus. An example of the data structure of the status report message is given below. As above described, this status report message is only an example, other data structure can also be designed by person skilled in the art.

TABLE 5 status report message

| Item | Value | Comment |
| --- | --- | --- |
| { | | |
| Message name | Status Report | Message type |
| Source | Tablet | Source device |
| Destination | Gateway | Destination device |
| Session ID | Storybook | |
| Media Type | MPEG4 Video | Media flow type |
| Media ID | http://192.168.1.4/Hello.mp4 | Media flow ID |
| Position | 13551 | The current position of video, in ms |
| Action | Play | Playback status of player |
| } | | |

Herein, the two terminals can simultaneously send status report messages in a periodical way, e.g. starting from a same time point, and sending status report messages every ten seconds; or send status report messages in response to a request message sent by the gateway. The position field of the status report message is used to calculate the delay variation for the media content within a same session ID. The terminal can detect the playback position currently being displayed on the terminal, and fill the detected position in the position field of the status report message.

At the 202, the gateway determines delay variation based on the received status report messages. As in this example, correlated videos use an identical SessionID. The delay variation is the difference between the values in position filed of the two status report messages.

At the 203, the gateway determines if the delay variation exceeds a predetermined threshold value. If not, the gateway will do nothing, or otherwise, it will go to step 204. The threshold value, or called maximum tolerable time delay varies with visual rhythm, or with a combination of visual rhythm and other factors (as in above example, the combination includes visual rhythm, view type and relationship exponent). The threshold value may be a delay time corresponding to an acceptable MOS (i.e. >=3) in the delay lookup table, besides, it can also be proportional to a delay time corresponding to an acceptable MOS in the delay lookup table. The gateway can automatically determine the threshold value for a received video by querying the delay lookup table.

Figure 3:
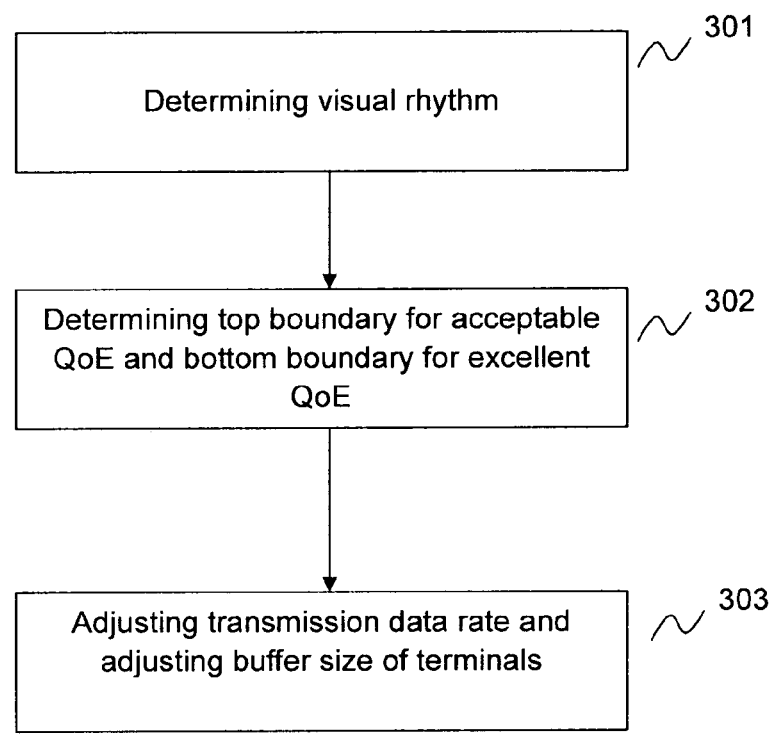
FIG. 3 is a flow chart illustrating an example of detailed steps for the step 204 of the FIG. 2 according to present embodiment.

At the 204, the gateway performs adjustment so as to eliminate viewer's feeling of out-of-synchronization at the presentation level of terminals. For example, the adjustment can be performed by gateway's adjusting transmission data rates to terminals and sending commands to terminals to change buffer size and/or rendering speed of terminals. Herein, the adjustment of transmission data rate for a video can be implemented by controlling buffer of the gateway. Specifically, 204 can be further divided into following steps in this example as shown by FIG. 3:

At the 301, the gateway determines the visual rhythm, view type and relationship exponent of the media content. As above described, the media content distributed by the gateway may be videos of two or more views for a same sport events, or a movie and its advertisement. It should note that the media content may includes other types of combinations of video, audio, flash, text etc. In case of videos of two or more views, the visual rhythm can be determined based on either video. And in case of movie and its advertisement, the visual rhythm is determined based on the main content, i.e. the movie. The information about view type and relationship exponent can be added within the media content and be able to be obtained by the gateway, or the gateway queries the content server for this information.

At the 302, the gateway determines a top boundary for acceptable QoE and bottom boundary for excellent QoE by querying the delay lookup table with the visual rhythm, view type and relationship exponent.

At the 303, the gateway adjusts transmission data rate and adjusts buffer size of terminals by sending commands to terminals. Generally, the buffer size of terminals is adjusted if the delay variation is not large. If the delay variation is bigger than a threshold value defined by the developer, he can use the play speed command to make one terminal fast forward with 1.5×, 2× etc. In addition, he can also instruct the one terminal to skip some video frames. A data structure for the command and an algorithm for content synchronization are provided below, where more details can be found.

TABLE 6

QoE command message

| Item | Value | Comment |
| --- | --- | --- |
| { | | |
| Message name | QoE Command | Message type |
| Source | Gateway | Source device |
| Destination | STB | Destination device |
| Session ID | Storybook | |
| Media Type | MPEG4 Video | Media flow type |
| Media ID | http://192.168.1.4/Hello.mp4 | Media flow ID |
| Buffer | +100 | Add the buffer length 100 kB |
| Speed | 1 | Play speed of current video |
| Action | Play | Playback command of player |
| } | | |

It is noted that 301 to 303 in FIG. 3 are one possible example for the proposed method and apparatus, and person skilled in the art may use a table with different fields and change the method accordingly. For example, the delay lookup table removes fields of view type and relationship, and consequently, the gateway needn't determine the view type and relationship exponent in 301.

C. Algorithm Description

Figure 4:
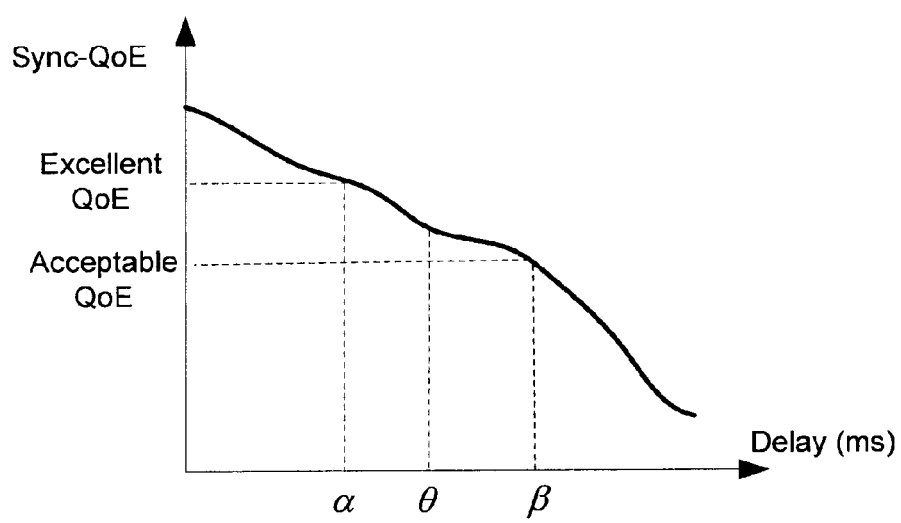
FIG. 4 is a diagram showing Sync-QoE and delay variation mapping sample according to present embodiment.

According to the QoE test for dual screens, the $\theta^f$, $\theta^n$, $\theta^s$ are defined as the threshold values for fast/normal/slow change visual rhythm content. FIG. 4 shows Sync-QoE and delay variation mapping sample. Assuming $\beta^f$, $\beta^n$, $\beta^s$ are the top boundary for acceptable QoE, $\alpha^f$, $\alpha^n$, $\alpha^s$ are bottom boundary for excellent QoE. $\theta$ is a proportion value of $\beta$, we define $\theta = p*\beta$, $0<p<1$ in the interval between $\alpha$ and $\theta$, a light-weighted rate control is done for slack adjustment, while in the interval between $\theta$ and $\beta$, a heavy-weighted rate control will be executed for sharp adjustment because the delay variation is close to top boundary. $\Delta t = |t_i - t_j|$ is the current delay variation between two terminals i and j. Assuming $t_i > t_j$, the data transmission rate $(r_i, r_j)$ to i and j and buffer adjustment $(b_i, b_j)$ in i and j uses the following formulas.

$$r_i = \begin{cases} r_i * (1 + (\Delta t - \alpha)/(\beta - \alpha)), & \alpha \le \Delta t < \theta \\ r_i^{(1+(\Delta t - \alpha)/(\beta - \alpha))}, & \theta \le \Delta t < \beta \\ r_i^{(1+\beta/\alpha)}, & \beta \le \Delta t \end{cases} \quad (1)$$

$$r_j = \begin{cases} r_j * (1 - (\Delta t - \alpha)/(\beta - \alpha)), & \alpha \le \Delta t < \theta \\ r_j^{((\Delta t - \alpha)/(\beta - \alpha))}, & \theta \le \Delta t < \beta \\ r_j^{(1/(\beta/\alpha))}, & \beta \le \Delta t \end{cases} \quad (2)$$

$$b_i = r_i * T^{req}, \quad b_j = r_j * T^{req} \quad (3)$$

Herein, $T^{req}$ is the time interval for "Status Request" query cycle, its frequency is also determined by the delay variation $\Delta t$ value. If it is less than $\alpha$, the frequency can be assigned as once per several seconds; if the $\Delta t$ locates inside $\alpha$ and $\beta$, the frequency is once per second; when the $\Delta t$ is larger than $\beta$, the frequency should be assigned in microsecond level for the repaid monitor for playing status.

Since too many screens will scatter the attention of human being, only two screens are considered in the above description; the adaptation mechanism can be extended to multiple screens application. After capturing all the status reports after one time query, a sort procedure can be fulfilled then determine the $t_i^{max}$ and $t_j^{min}$, and the $\Delta t = t_i^{max} - t_j^{min}$. The detailed algorithm in pseudo code is as follows.

```
Begin
    Initialize boundary value α',α",α' and β',β",β'
    Determine threshold value θ',θ",θ'
    Set T^req
// Adaptation
    Send Status Request message to all terminals;
    For each round of scheduling // determined by request cycle
    Wait for status report from terminal;
    Calculate each delay value
    Sort delay value, determine t_i^max,t_j^min
    Calculate delay variation Δt = t_i^max - t_j^min
    Analyze current visual rhythm vr={fast/normal/slow};
    If (Δt < α^vr ) adjust T^req in several seconds level
        Elseif (α^vr ≤ Δt < β^vr) adjust T^req in second level
            Else adjust T^req in microsecond level;
    End
    Calculate r_i,r_j,b_i,b_j // based on above formulas
    Adjust transmit rate in gateway in accordance with r_i,r_j
    Send QoE command including b_i,b_j to terminal;
    Send Status Request message to all terminals;
    End
End
```

Sometimes the videos on display devices are out of synchronization because of the poor network connection between video servers and the gateway. Therefore, in order to solve the problem, the buffer in the gateway can be increased so as to buffer more data, and consequently have sufficient data to transmit to terminal(s).

Although above embodiment is given between videos, the principle of present invention also applies to other circumstances that may cause viewer to feel out-of-synchronization, e.g. video and audio, video and subtitle etc.

According to a variant of proposed method and apparatus, other content distribution devices can be used to replace the gateway, such as a router with above mentioned functions.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for synchronizing content playback at the presentation level, wherein, a first content is presented on a first device to a viewer and a second content that is the same as or correlated with the first content is presented on a second device to the viewer, comprising:
    receiving status messages from the first device and the second device, wherein the status messages include information about playback positions of the first content and the second content currently being played back for the viewer at the presentation level of the first device and the second device; and
    in response to a difference between playback positions of the first content and the second content included in the status messages being above a first threshold value, performing an adjustment to maintain the difference of playback positions of the first content and the second content at the presentation level of the first device and the second device below the first threshold value, and
    in response to the difference not being above the first threshold value performing no adjustment,
    wherein the performing of an adjustment further comprises if the difference is larger than the first threshold value but is not larger than a second threshold value, adjusting a buffer size of at least one of the first device and the second device;
    if the difference is larger than the second threshold value, adjusting a playback speed of one of the first device and the second device or instructing one of the first device and the second device to skip a certain number of content frames, and wherein the first threshold value is determined via a lookup table indicating relationship between delay values and
    a visual rhythm parameter reflecting a subjective measure of speed of the content appearance variation or change in an interval.

2. The method of claim 1, wherein status messages are periodically received from the first device and the second device.

3. The method of claim 1, wherein before receiving status messages, the method further comprises sending a request message instructing to send status report messages.

* * * * *